United States Patent

Oostenbrink

[11] 3,879,069
[45] Apr. 22, 1975

[54] PIPE CONNECTION

[75] Inventor: Albertus Anthony Oostenbrink, Hardenberg, Netherlands

[73] Assignee: Wavin B.V., Zwolle, Netherlands

[22] Filed: Sept. 28, 1973

[21] Appl. No.: 401,967

[52] U.S. Cl. .............................................. 285/162
[51] Int. Cl. ............................................ F16l 41/00
[58] Field of Search .......... 285/158, 192, 202, 203, 285/204, 162

[56] References Cited
UNITED STATES PATENTS

| | | | |
|---|---|---|---|
| 906,870 | 12/1908 | Grabel | 285/158 |
| 3,490,791 | 1/1970 | Mitchell | 285/162 X |
| 3,548,079 | 12/1970 | Jones | 285/158 X |
| 3,677,578 | 7/1972 | Roos | 285/162 |

*Primary Examiner*—Alfred R. Guest

[57] ABSTRACT

A pipe connection comprising a main pipe and a branch pipe, the branch pipe being screwed into a sealing sleeve provided with an internal screw thread. The peripheral end part of the sleeve situated in the main pipe is adapted to the wall part surrounding the opening in the main pipe and is of a substantially uniform thickness.

12 Claims, 2 Drawing Figures

PIPE CONNECTION

BACKGROUND OF THE INVENTION

My invention relates to a pipe connection comprising an elastic sealing sleeve with a recess, which cooperates with the wall part surrounding an opening in the curved wall of a second pipe part, while on the other hand a first pipe part with a screw thread profile cooperates with a helically extending profile in the sealing sleeve, the latter profile substantially corresponding to the screw thread profile. The first pipe part further comprises a shoulder which cooperates with the upper side of the sealing.

Such connections which lend themselves well for realizing sewer systems are known per se. They have the disadvantage, however, that in particular cases leakage towards the exterior occurs. Attemps to obviate the afore-mentioned difficulties by selecting other sealing materials, particularly the type of rubber used for the sealing sleeve, has resulted in small improvements but one is often obliged to employ rubber materials for the sealings which are insufficiently resistant to the liquids transmitted through the first and second pipe line.

SUMMARY OF THE INVENTION

My invention aims to provide a pipe connection of the aforementioned type in which the leakage risk, particularly between the upper side of the sealing sleeve and the shoulder, is substantially precluded.

According to my invention, this is attained by the arrangement wherein the peripheral end part of the sealing sleeve situated in the interior of the first pipe part is adapted to the curvature of the curved wall part and said peripheral end part situated in the interior is of a substantially uniform thickness. Preferably the sealing sleeve and/or the shoulder are provided, on the cooperating surfaces, with protruding sealing parts.

The upper side of the sealing sleeve is preferably, provided with at least one projecting circular ring.

This embodiment is particularly efficient, so as to obtain the desired sealing without leakage risk from the interior of the first or second pipe towards the exterior.

The projecting ring is advantageously constructed such that it is turned over in a direction away from the opening, in the finished pipe connection.

The shaping of the peripheral part of the sealing sleeve situated in the interior of the first pipe part to the curvature of the curved wall part is used for preventing a substantial change in the passage of the first pipe cross section.

The elastic sealing sleeve has at least one flange or groove on its outer side, which cooperates with the second pipe part, while the helical profile is situated on the inner side of the sealing sleeve, which cooperates with the first pipe part, likewise provided with a screw thread profile on its surface cooperating with the inner side of the sealing sleeve.

Such a connection is particularly suitable for establishing a branch connection between, for example, a main sewer pipe and a drain. A great advantage is that the circumferential edge of an opening in a main sewer pipe can be caused to snap into the groove, while on the other hand the helically extending profile allows a socket also provided with a screw thread profile at its end to be screwed into the sealing.

The tops of the screw thread profile of the first pipe part lie advantageously on a truncated cone surface. Consequently one can possibly push away to a degree, the material of the elastic sealing sleeve when an unmounted sealing sleeve is applied, the hollows of the profile being situated on a cylindrical surface, whereby the elastic material is pressed against the circumferential edge of the opening in the second pipe part and a proper seal is obtained between this edge and the sealing sleeve on the one hand and the connecting part or first pipe on the other hand. In addition thereto, the cooperation of the groove with the circumferential edge of the opening ensures a firm securing between the two pipe parts.

DESCRIPTION OF PREFERRED EMBODIMENTS

Figure 1:
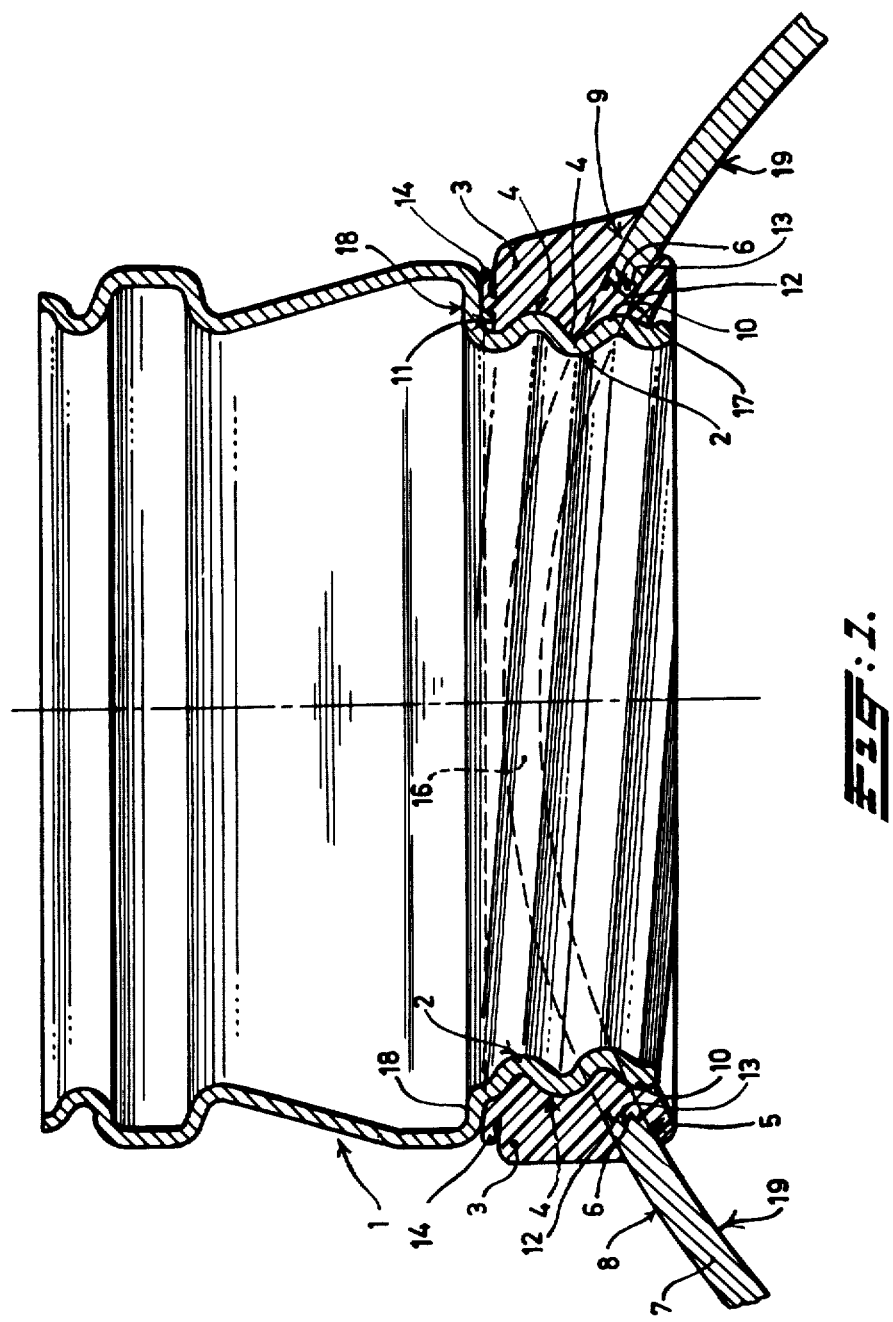
FIG. 1 is a cross-section of a branch pipe connection according to the invention, between two pipe parts.
Figure 2:
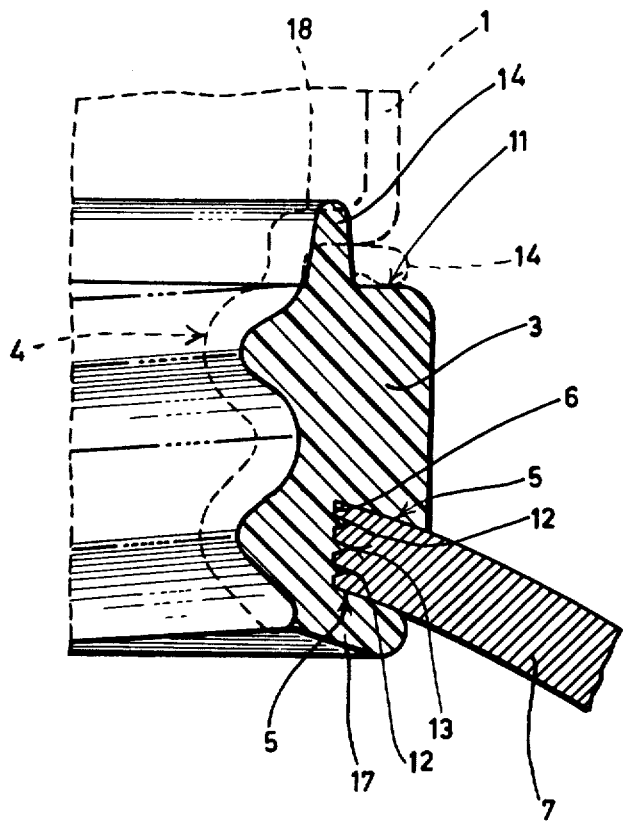
FIG. 2 shows a detail of the same branch pipe connection between the two pipe parts in FIG. 1.

FIGS. 1 and 2 show a branch pipe connection comprising a first pipe part 1 in the shape of a socket serving as a branch pipe for a second pipe part in the shape of a main sewer pipe 7.

The first pipe part or socket 1 is provided at its end with a screw thread profile 2. This screw thread profile cooperates with an almost corresponding screw thread profile 4 in a rubber sealing sleeve 3. The sealing sleeve 3 is further provided with a groove 5 into which the circumferential edge 6 of the opening in the main sewer pipe can be snappingly inserted. Instead of a groove 5 it suffices in some cases to provide a single flange 9 on the rubber sleeve, which then cooperates with the outer side 8 of the main sewer pipe 7 and with the circumferential edge 6 when this sleeve is clampingly pressed against this edge 6.

The sealing sleeve 3 can be easily forced against the edge by the arrangement wherein the sealing the hollows of the profile are provided on a cylindrical surface whereas the crests 10 of the profile on the outer side of the socket 1 are provided on a surface shaped as a truncated cone. This means that the outer side of the socket, at its end with the screw thread profile, tapers towards its free end. On screwing in the socket 1, the crests of the thread disposed at the end of the socket 1, will press the rubber material of the sealing sleeve 3 outwardly, and against the circumferential edge 6. As a result a clamping effect is obtained.

When no groove is available, one can press the rubber material vigorously against the circumferential edge, due to a suitable selection of the profile, whereby the socket and pipe 7 cannot possibly come apart. It is however, advisable to use a groove since the same assists in obtaining a proper connection. The socket 1 is provided with a shoulder 18 which ensures that the socket 1 is screwed into the sleeve over the desired length. Additionally, the shoulder contributes to a proper fixation of the socket 1. The shoulder 18 cooperates with the upper edge 11 of the sealing sleeve.

If desired, the circumferential edge may have a particular profile to ensure a proper cooperation with the rubber material.

For connecting the socket 1 to other pipes all known pipe connection constructions can be used which, however, will not be further elucidated.

The sealing sleeve 3 consists preferably of rubber material with a Shore hardness of seventy, while the pipes 7 and 1 consist preferably of thermoplastics such as polyvinylchloride or polyethylene, but pipes made of fibre-reinforced thermosetting resin can be used as well.

Obviously the groove 5 or the surface of the flange 9 are adapted to the surface of the pipe wall of the main pipe, which cooperates with this flange 9 or with the grooves. The bottom 13 of the groove 5 is provided with one or two circumferential ribs 12 which facilitate the screwing of the socket 1 and prevent leakage owing to an inaccurate shape of the opening.

It is evident that due to the presence of single, double or quadruple screw threads, screwing of the sealing can be easily effected. When another pipe part is to be inserted, the sealing will be very well retained and even in case of rather heavy pressures it will not tend to unscrew, the more so since the walls of the groove can be shaped in such a way that they taper towards the open upper side, whereby a proper clamping effect is exerted on the sealing sleeve. The pitch on the profile and pipe is identical, but differences are permissible due to the elastic material.

It has been found that in some cases leakage may occur between the side of the shoulder 18, cooperating with the upper edge 11 of the sealing sleeve 3. This can be efficiently prevented by providing circular ring 14 on the upper edge 11 of the sealing sleeve. In the finished pipe connection the ring 14 is turned over and extends in a direction away from the opening 16.

In order to effect a minor change in the passage of the pipe part 7, it is advisable to impart such a configuration to the peripheral end part 17 inserted into the pipe part 7, that it extends almost parallel to the circumference 19 of the wall of the pipe part 1 and is of a substantially uniform thickness.

What I claim is:

1. A pipe connection between a first pipe and an opening in a curved wall of a second pipe, said connection comprising an elastic recessed sealing sleeve which extends into the opening in the curved wall of the second pipe and engages said wall on the inside and outside thereof, said first pipe having an external screw thread, said sleeve having an internal thread substantially corresponding to the external screw thread on said first pipe and in threaded engagement therewith, said first pipe having a shoulder which abuts against the upper end of the sealing sleeve, said sleeve having a peripheral end part situated in the interior of the second pipe and corresponding to the curvature of said curved wall, said peripheral end part being of substantially uniform thickness.

2. A pipe connection as claimed in claim 1 comprising a ring element sandwiched between said shoulder and said sealing sleeve.

3. A pipe connection as claimed in claim 2 wherein said ring element is integral with said sleeve.

4. A pipe connection as claimed in claim 3 wherein said ring element projects upwardly from said upper end of said sleeve.

5. A pipe connection as claimed in claim 4 wherein said ring element is flexible and is deformed in the assembled pipe connection to extend radially outwards.

6. A pipe connection as claimed in claim 1 wherein said elastic sealing sleeve comprises, at lease in the region engaging the outside of said wall, a flange which cooperates with the second pipe.

7. A pipe connection as claimed in claim 6 wherein said flange corresponds in shape substantially with the shape of the wall with which the flange cooperates.

8. A pipe connection as claimed in claim 1 wherein said first pipe includes a truncated conical portion on which said external threads are formed, the smallest diameter of said conical portion being at a free end of said first pipe.

9. A pipe connection as claimed in claim 1 wherein said sleeve has a groove in which said wall of the second pipe is received, said sleeve having a bottom surface at said groove which is provided with at least one circumferential rib.

10. A sealing sleeve of elastic material having an inner helically threaded profile, an outer surface with an annular groove therein, and an upper edge with an upstanding projecting portion therein, said sleeve having an annular portion bounding the lower edge of the groove, said annular portion being of substantially uniform thickness.

11. A pipe connection as claimed in claim 10 wherein the diameter of said inner threaded profile decreases from the upper edge to the lower edge.

12. A pipe connection as claimed in claim 10 wherein said sleeve has ribs thereon at the bottom of said groove.

* * * * *